Aug. 19, 1958 J. WILSON 2,848,083
HAND BRAKE FOR RAILROAD CARS
Filed Nov. 23, 1953
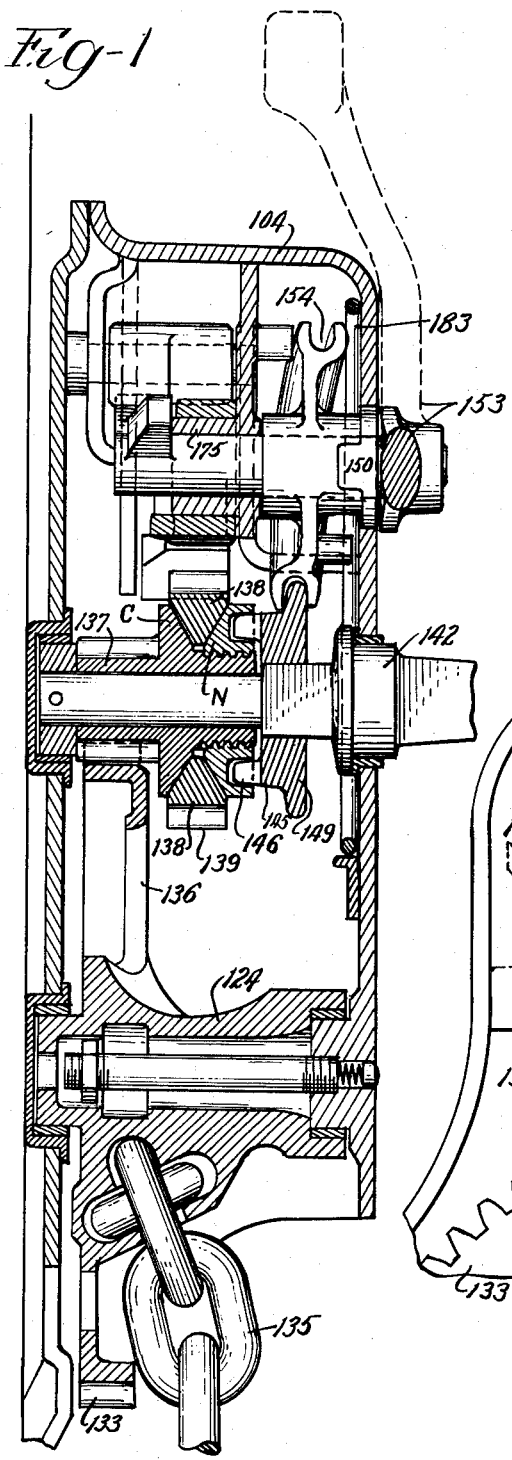
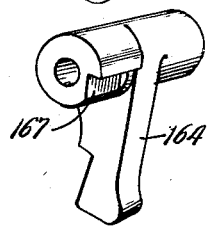
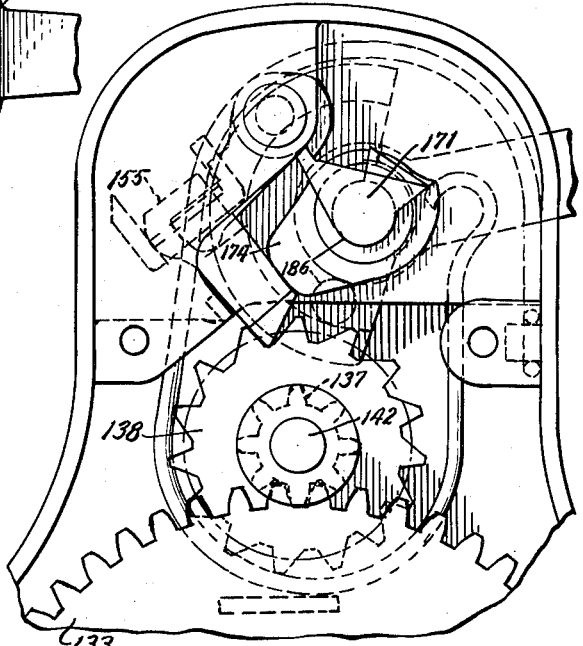
INVENTOR.
Jack Wilson
BY
Mann, Brown & Hansmann
Attys.

United States Patent Office 2,848,083
Patented Aug. 19, 1958

2,848,083
HAND BRAKE FOR RAILROAD CARS

Jack Wilson, Chicago, Ill., assignor to Universal Railway Devices Co., a corporation of Delaware Application November 23, 1953, Serial No. 393,737

4 Claims. (Cl. 192—16)

The principal object of this invention is to provide the mechanism disclosed in the Camp Patent No. 2,318,569, May 4, 1943, with a graduated or controlled release.

Generally speaking, this is accomplished by inserting a friction clutch between the driving pinion and the holding ratchet operable by the driving shaft.

In the drawings:

Fig. 1 is a vertical section corresponding to Fig. 20 of the Camp patent with the friction clutch inserted between the jaw clutch and the driving pinion;

Fig. 2 is a rear elevation corresponding to Fig. 22 of the Camp patent; and

Fig. 3 is a perspective view corresponding to Fig. 25 of the Camp patent.

But in Figs. 2 and 3 the counter weight 166 shown in the Camp patent is omitted.

Referring to Fig. 1, the ratchet wheel 138 is made separate from the pinion 137 and provided with opposite conical faces cooperating with conical faces on a clutch collar C integral with the pinion and a nut N threaded onto a reduced end of the pinion 137 and cooperating with the jaws 146 on the clutch sleeve 145.

Otherwise, the brake mechanism is substantially the same as disclosed in the mentioned figures of the Camp patent and operates as described on pages 4 and 5 of that patent.

In addition, however, due to the presence of the friction clutch, a graduated or controlled release is attained. When such a release is sought, the hand wheel shaft 142 will be given a slight counterclockwise rotation, which will have the effect of loosening the nut and permitting the pinion to rotate in the ratchet wheel 138 under control of the operator, who can permit just the desired gradual release under perfect control at all times.

I claim:

1. In a hand brake for railroad cars, a housing adapted to be mounted on a car, a hand wheel shaft journalled in the housing to rotate about a substantially horizontal axis, a pinion concentrically mounted loosely on the shaft, a ratchet wheel concentrically mounted loosely on the pinion, and a friction clutch between the pinion and the ratchet wheel including an element fast to the pinion and a nut element in threaded relation to the pinion.

2. The arrangement of claim 1 wherein said pinion and said nut are formed with facing conical friction surfaces and wherein said ratchet wheel has conical friction surfaces on opposite sides thereof mating with said first-mentioned friction surfaces.

3. In a hand brake for railroad cars, said brake including a housing adapted to be mounted on a car, a hand wheel shaft journalled in the housing to rotate about a substantially horizontal axis, pinion and ratchet means rotatably mounted loosely on the shaft, and means including a sleeve-like jaw clutch member that is slidably keyed on said shaft and jaw clutch operating means independent of the hand shaft for shifting said jaw clutch member axially of the shaft, the improvement wherein said pinion and ratchet means comprises a pinion rotatably mounted loosely on the shaft adjacent said jaw clutch member, with the end of said pinion adjacent said jaw clutch member being threaded concentrically about the axis of said shaft, a ratchet wheel rotatably mounted loosely on said pinion and a nut mounted in threaded relation on said end of the pinion for jaw clutch engagement with said jaw clutch member, said pinion and nut having facing annular friction surfaces and said ratchet wheel having annular friction surfaces on opposite sides thereof and disposed between and mating with said friction surfaces.

4. The arrangement of claim 3 wherein said friction surfaces are conical.

References Cited in the file of this patent

UNITED STATES PATENTS

| 2,268,228 | Van Cleave | Dec. 30, 1941 |
| 2,318,569 | Camp et al. | May 4, 1943 |
| 2,675,835 | Kiekhaefer | Apr. 20, 1954 |